Nov. 11, 1952  W. F. MERRITT  2,617,465
ANTISKID DEVICE
Filed July 15, 1949
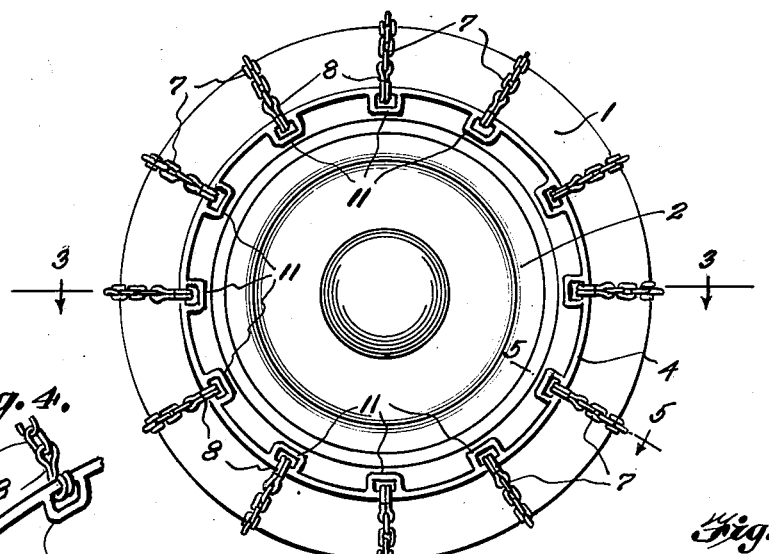
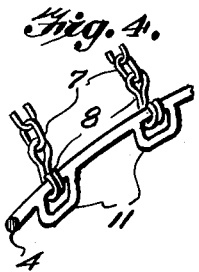
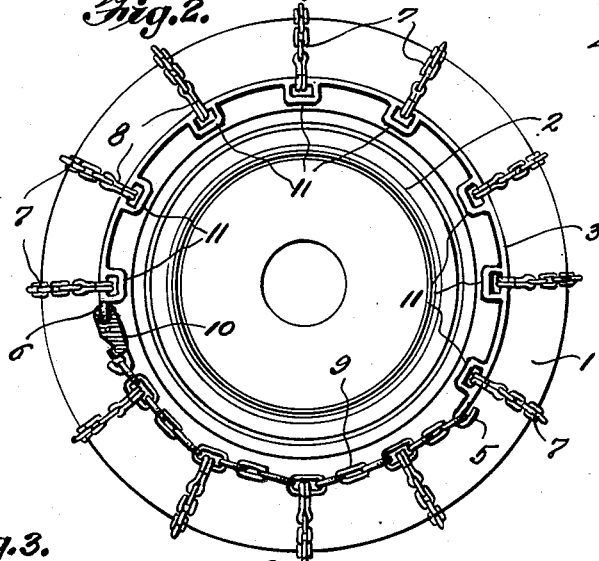
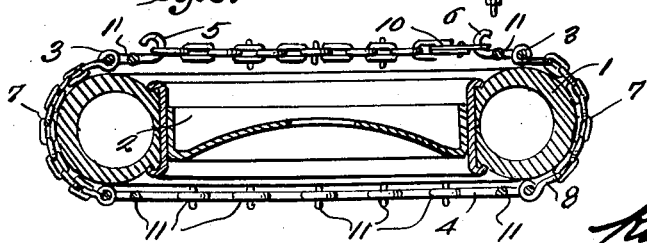
INVENTOR.
WILLIAM F. MERRITT
ATTY.

Patented Nov. 11, 1952

2,617,465

UNITED STATES PATENT OFFICE 2,617,465

ANTISKID DEVICE

William F. Merritt, Middletown, N. Y., assignor to Eleanor K. Merritt, Middletown, N. Y.

Application July 15, 1949, Serial No. 104,909

1 Claim. (Cl. 152—242)

This invention relates to an antiskid device for tires and it is one object of the invention to provide an antiskid device consisting of side rings and chains carried thereby for passing transversely across a tire, the side rings being so constructed that the antiskid device may be applied to a tire without jacking up a wheel.

Another object of the invention is to provide side rings of such formation that chains will be held spaced from each other circumferentially of the rings and very effectively prevented from sliding along the rings out of predetermined spaced relation to each other.

Another object of the invention is to provide rings which are formed of strong metal rods bent to circular shape and carrying eyes of anchors which are also formed of metal and welded to the rings in such manner that while the cross chains will be held in predetermined spaced relation to each other they will be loosely engaged with the rings, permitted to have limited movement upon the rings and thus prevented from causing undue wear upon the tire across which they extend.

Another object of the invention is to so form one ring that it will be an incomplete circle and have its ends engaged with ends of a side chain which is releasable so that the side chain may be detached and the incomplete ring readily passed across a tire during application of the antiskid device to a wheel or removal of the antiskid device when use thereof is not necessary.

The improved antiskid device is illustrated in the accompanying drawings wherein:

Fig. 1 is a side elevation looking at the outer side of a wheel and tire to which the antiskid device is applied.

Fig. 2 is a side elevation looking at the inner side of the wheel.

Fig. 3 is a sectional view taken along the line 3—3 of Figure 1.

Fig. 4 is a view showing a portion of a side ring and cross chains in perspective.

Fig. 5 is a fragmentary sectional view taken along the line 5—5 of Figure 1.

This improved antiskid device is intended for use upon a tire which is mounted upon a wheel 2 of conventional construction. The antiskid device has inner and outer rings 3 and 4 which are formed of strong metal rods, the outer ring being a complete circle and the inner ring being an incomplete circle of the same diameter as the complete ring and having its ends bent to form hooks 5 and 6. The outer ring may be formed of stiff metal but the inner ring must be resilient so that its ends spaced from each other a distance less than its diameter and may be spread away from each other a sufficient distance to allow this ring to be moved transversely across the tire and into place against the inner side of the tire when applying the antiskid device to the tire. Cross chains 7 extend across the tire and at their ends are provided with hooks which are loosely engaged about the rings, certain of these cross chains having the hooks at one end engaged with a side chain 9 of such length that it may have one end engaged with the hook 5 and its other end engaged with a securing clip 10 carried by the hook 6. This hook or clip 10 is of conventional formation and when secured applies pull upon the side chain 9 and the inner ring 3. It is important that the cross chains be held spaced from each other equal distances about the tire and in order to do so the two rings carry anchors 11 which are formed from strong metal rods cut to a predetermined length and bent to form U-shaped anchors. The anchors have their arms welded to the rings, and upon referring to Figures 1 and 2 it will be seen that the anchors project from the rings inwardly thereof and are of such size that the hooks 8 may fit loosely about the rings and have very limited movement circumferentially of the tire and since the arms of the anchors are welded to the rings it is impossible for the chains to move out of the positions in which they are confined by the anchors and move about the rings to positions close to each other. It will thus be seen that the cross chains will be kept spaced from each other equal distances and in proper positions for gripping snow and ice when in use. As the rings are not secured in fixed positions the entire antiskid device may move about the wheel circumferentially thereof and the cross chains will not cause the tread portion of the tire to be scored and weakened.

Having thus described the invention, what is claimed is:

An antiskid device for tires comprising a continuous side ring formed of resilient metal, a partial side ring formed of resilient metal and having ends spaced from each other and bent to form outstanding hooks, the distance between the ends of the partial ring being less than the diameter of the continuous ring, U-shaped anchors formed of stiff metal and having ends of their arms welded to the said rings, said anchors being disposed in equally spaced relation to each other circumferentially of the rings and being extended inwardly from the rings in a direction radially thereof, cross chains for extending transversely across a tire having hooks at their ends straddled by the anchors and loosely engaged about portions of the rings between the arms of the anchors and thereby mounted directly upon the rings and prevented from moving circumferentially of the rings out of predetermined spaced relation to each other by the arms of the anchors, a side chain having an end engaged with the hook at one end of the partial ring, certain of said cross chains having hooks at their inner ends mounted through links of the said side chain, and a fastener carried by the hook at the other end of the partial ring and engageable with selected links of the side chain for applying pull to the side chain and preventing spreading of the partial ring.

WILLIAM F. MERRITT.

REFERENCES CITED

The following references are of record in the file of this patent:

UNITED STATES PATENTS

| Number | Name | Date |
| --- | --- | --- |
| 1,478,059 | Pye | Dec. 18, 1923 |
| 2,427,973 | Merritt | Sept. 23, 1947 |
| 2,458,642 | Reynolds | Jan. 11, 1949 |
| 2,493,994 | Newman | Jan. 10, 1950 |

FOREIGN PATENTS

| Number | Country | Date |
| --- | --- | --- |
| 680,120 | France | Jan. 17, 1930 |